United States Patent
Teague et al.

(10) Patent No.: US 11,371,840 B2
(45) Date of Patent: Jun. 28, 2022

(54) ESA BASED ALTIMETER

(71) Applicant: Rockwell Collins, Inc., Cedar Rapids, IA (US)

(72) Inventors: Jacob Teague, West Melbourne, FL (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 60 days.

(21) Appl. No.: 17/083,075

(22) Filed: Oct. 28, 2020

(65) Prior Publication Data

US 2022/0128354 A1     Apr. 28, 2022

(51) Int. Cl.
*G08B 23/00*     (2006.01)
*G01C 5/00*     (2006.01)
*G01S 13/88*    (2006.01)

(52) U.S. Cl.
CPC ............ *G01C 5/005* (2013.01); *G01S 13/882* (2013.01)

(58) Field of Classification Search
CPC ........ A23K 20/15; A23K 10/16; A23K 10/30; A23K 50/75
USPC ....................................................... 340/970
See application file for complete search history.

(56) References Cited

U.S. PATENT DOCUMENTS

| | | | |
|---|---|---|---|
| 3,528,070 A | 9/1970 | Young, Jr. | |
| 5,828,332 A * | 10/1998 | Frederick | G01S 13/935 342/197 |
| 6,628,228 B1 | 9/2003 | Matich et al. | |
| 7,145,501 B1 * | 12/2006 | Manfred | G01S 13/89 342/120 |
| 8,515,600 B1 | 8/2013 | McCusker | |
| 8,643,533 B1 | 2/2014 | Woodell et al. | |
| 9,041,587 B2 | 5/2015 | Longstaff | |
| 9,419,329 B1 | 8/2016 | West et al. | |
| 2008/0074308 A1 * | 3/2008 | Becker | G01S 13/70 342/120 |
| 2008/0074312 A1 * | 3/2008 | Cross | G06T 15/10 342/25 A |
| 2009/0122295 A1 * | 5/2009 | Eaton | G01S 17/87 342/357.31 |
| 2010/0141527 A1 | 6/2010 | Lalezari | |
| 2014/0125511 A1 | 5/2014 | Longstaff | |

FOREIGN PATENT DOCUMENTS

| | | |
|---|---|---|
| CN | 103487798 A | 1/2014 |
| EP | 3470875 A1 | 4/2019 |

OTHER PUBLICATIONS

Extended Search Report in European Application No. 21205364.9 dated Mar. 25, 2022, 10 pages.

(Continued)

*Primary Examiner* — Tai T Nguyen
(74) *Attorney, Agent, or Firm* — Suiter Swantz pc llo

(57) ABSTRACT

A radio altimeter includes an electronically scanned array antenna. Orthogonal sweeps by the electronically scanned array antenna are used to identify a highest point in a region beneath the aircraft without the need for strong reflection. The electronically scanned array antenna may be reconfigured to scan a subregion including the highest point with a higher frequency beam and/or integrate multiple sweeps over time for a more accurate measurement.

17 Claims, 5 Drawing Sheets

(56) References Cited

OTHER PUBLICATIONS

Parsons CL et al.: "Beam-Limited Radar Altimetry", Remote Sensing Science for the Nineties. Maryland, May 20-24, 1990; [Proceedings of the International Geoscience and Remote Sensing Symposium. (IGARSS)], New York, IEEE, US, vol. 2, May 20, 1990 (May 20, 1990), pp. 1435-1438, XP000146822.

\* cited by examiner

ESA BASED ALTIMETER

BACKGROUND

Current radio altimeters are limited in range after which a "no computed data" value is set. This has resulted in several workarounds to determine when data is available and how it should be used at low altitudes. In addition to the limited technical capabilities of current altimeters, the FCC has approved repurposing of frequencies neighboring the C-band frequency which will degrade existing altimeter performance. Furthermore, traditional C-band altimeters require strong reflection from cement or asphalt to operate.

SUMMARY

In one aspect, embodiments of the inventive concepts disclosed herein are directed to a radio altimeter with an electronically scanned array antenna. Orthogonal sweeps by the electronically scanned array antenna are used to identify a highest point in a region beneath the aircraft without the need for strong reflection.

In a further aspect, the electronically scanned array antenna is reconfigured to scan a subregion including the highest point with a higher frequency beam for a more accurate measurement.

In a further aspect, multiple sweeps are integrated over time for a more accurate measurement.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
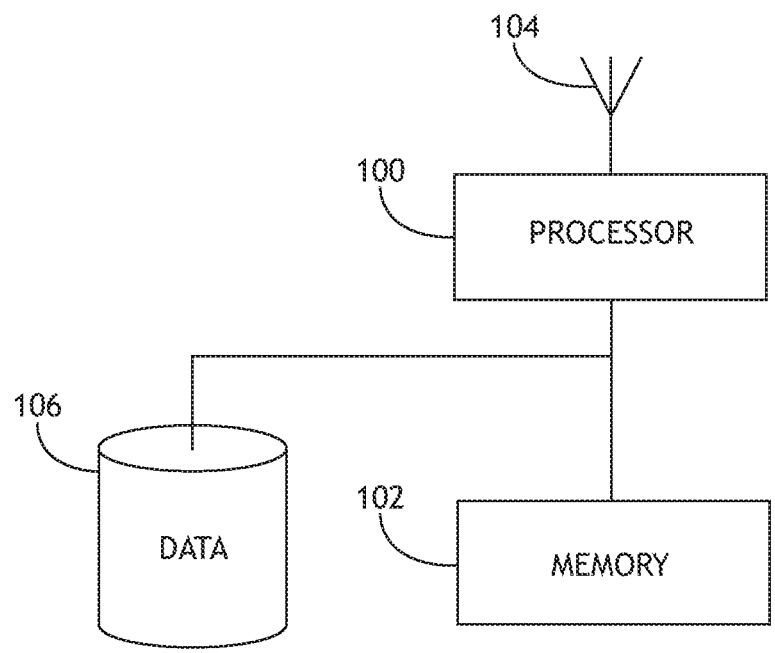
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radio altimeter with an electronically scanned array antenna. Orthogonal sweeps by the electronically scanned array antenna are used to identify a highest point in a region beneath the aircraft without the need for strong reflection.

Referring to FIG. 1, a block diagram of a system for implementing an exemplary embodiment is shown. The system includes a processor 100, memory 102 connected to the processor 100 for storing processor executable code, and an electronically scanned array antenna 104 in data communication with the processor 100 via a system of amplifiers and phase shifters in a feed layer. The processor 100 periodically configures the electronically scanned array antenna 104 to scan a region below an aircraft along a first axis, receive a first return signal, scan the region along an orthogonal second axis, receive a second return signal, and identify a highest point in the region with reference to the first return signal and second return signal; for example, by identifying the shortest return time in each sweep, which may be translated into a location with respect to the aircraft based on the beam angle that produced each shortest return time.

In at least one embodiment, after identifying the highest point in the region, the processor 100 may configure the electronically scanned array antenna 104 to perform a second set of orthogonal sweeps of a subregion including the highest point. The second set of sweeps is configured to produce a more accurate altitude measurement. Such second sweep may also produce a more accurate location measurement of the highest point view a narrower beam angle.

In at least one embodiment, sweep return signals are stored in a data storage element 106 to be integrated over time. Such integration may produce increased location and altitude accuracy.

In at least one embodiment, the processor 100 operates the electronically scanned array antenna 104 as a pulse radar by iteratively, sequentially configuring the electronically scanned array antenna 104 to transmit and then receive. Furthermore, the electronically scanned array antenna 104 may be directed to reject sources of interference.

In at least one embodiment, radiating elements may be selectively disabled to significantly lower power usage for lower resolution sweeps. The electronically scanned array antenna 104 may be configured to operate in the X-band frequency. The electronically scanned array antenna 104 may be configured to produce cosecant squared beam pattern.

Figure 2:
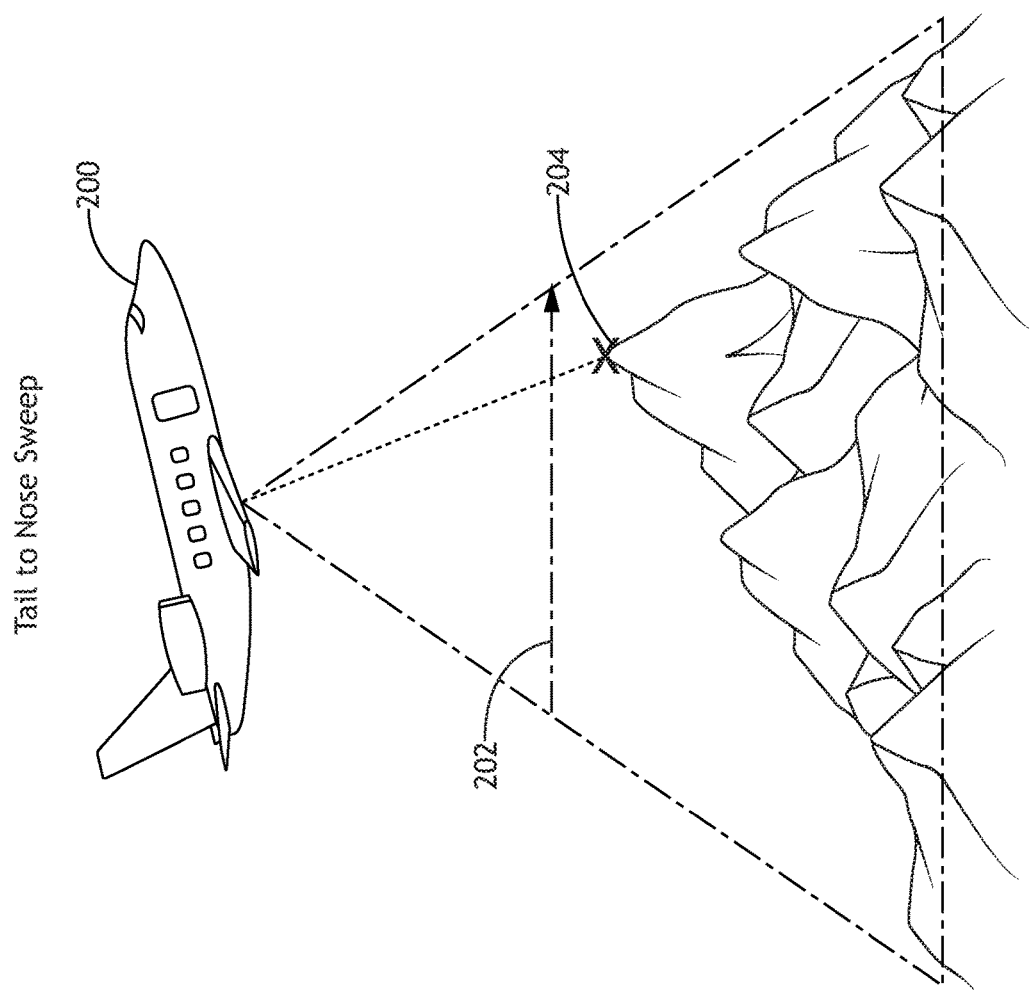
FIG. 2 shows a block representation of an electronically scanned array sweep according to an exemplary embodiment.

Referring to FIG. 2, a block representation of an electronically scanned array sweep according to an exemplary embodiment is shown. During an altitude measuring process, an aircraft 200 with an electronically scanned array antenna performs a first sweep along an axis 202 from the tail to the nose of the aircraft 200. Based on the return time of the signal, a highest altitude point 204 is identified. In at least one embodiment, the return signal may indicate a relative location of the highest point with respect to the nose-to-tail sweep.

Figure 3:
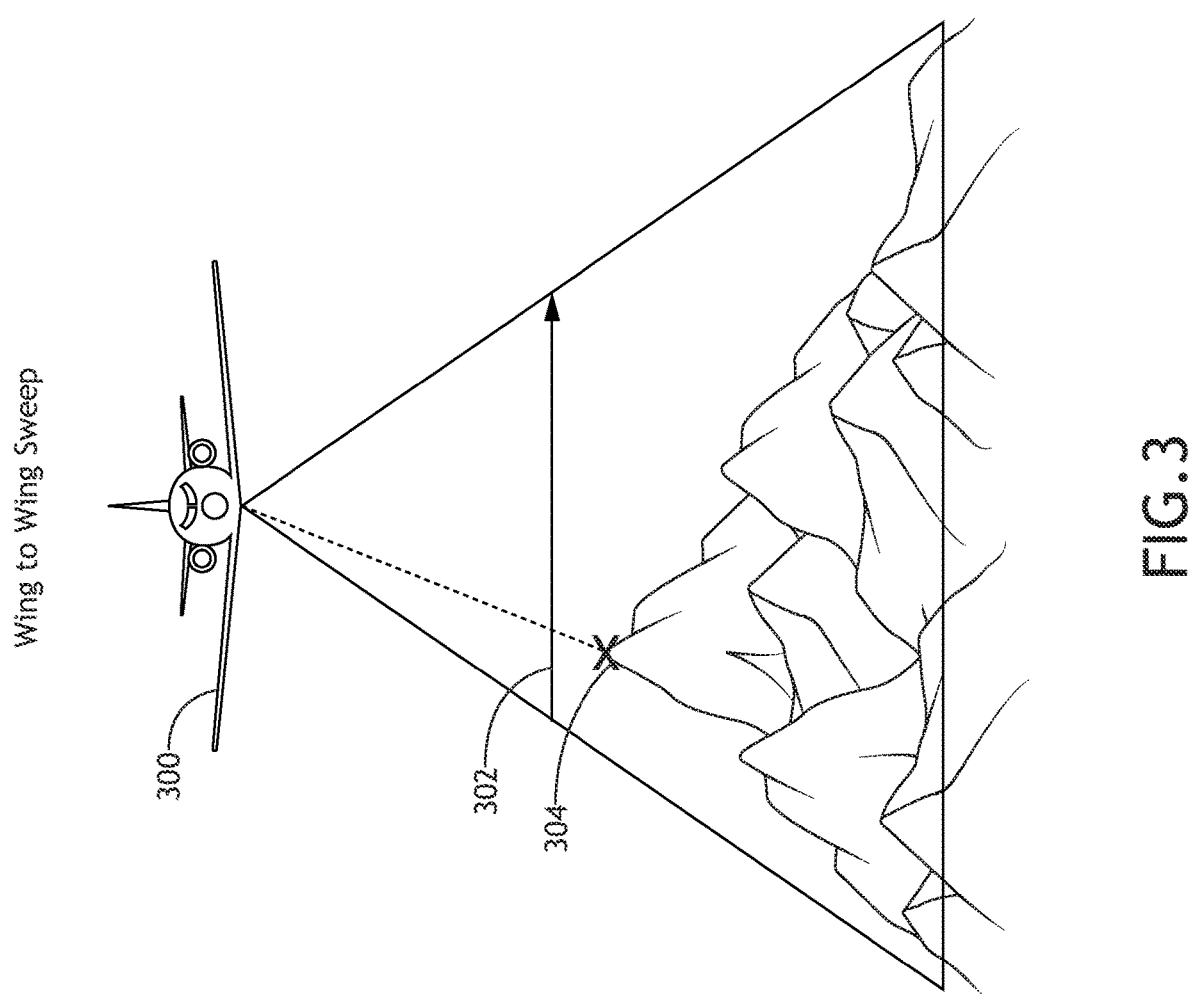
FIG. 3 shows a block representation of an electronically scanned array sweep according to an exemplary embodiment.

Referring to FIG. 3, a block representation of an electronically scanned array sweep according to an exemplary embodiment is shown. During the altitude measuring process, an aircraft 300 with an electronically scanned array antenna performs a second sweep along an axis 302 from one wingtip to the other. Based on the return time of the signal, a highest altitude point 304 is identified. In at least one embodiment, the return signal may indicate a relative location of the highest point with respect to the wingtip-to-wingtip sweep.

Figure 4:
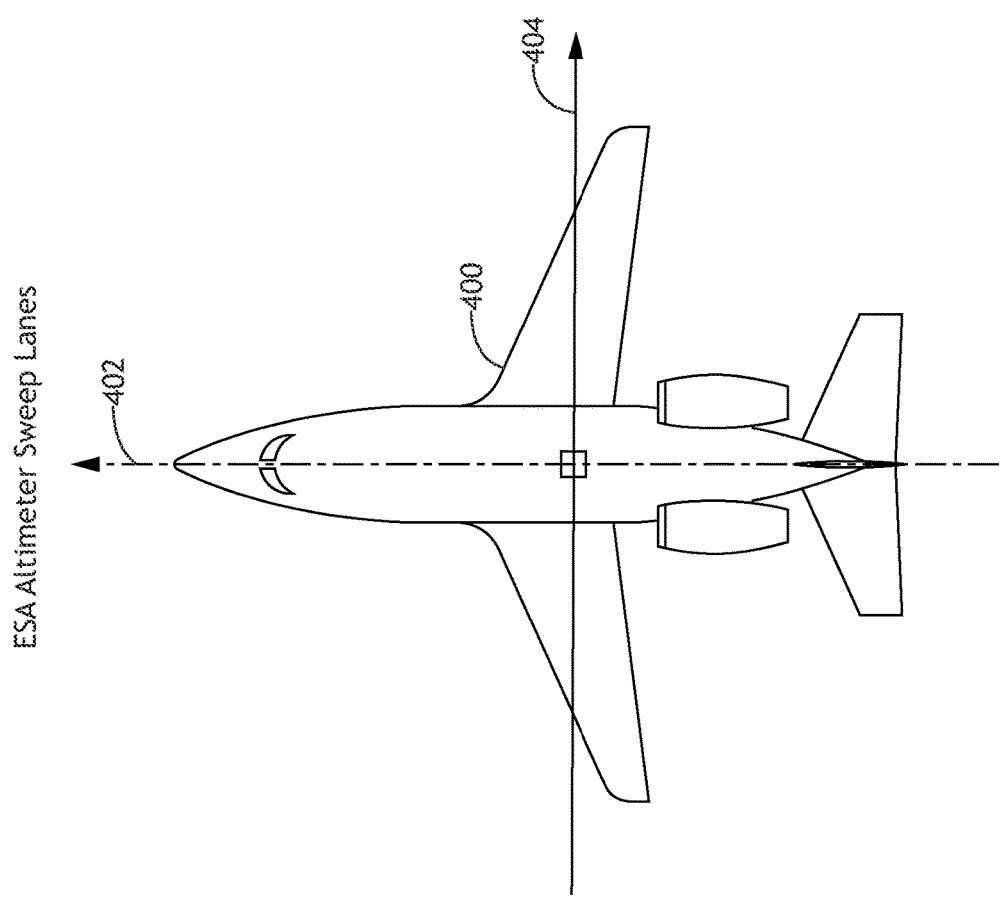
FIG. 4 shows a block representation of sweep paths according to an exemplary embodiment.

Referring to FIG. 4, a block representation of sweep paths according to an exemplary embodiment is shown. An aircraft 400 utilizing an electronically scanned array antenna for altitude measurement may perform a first sweep along a first axis 402 and a second sweep along a second axis 404 orthogonal to the first axis 402.

Figure 5:
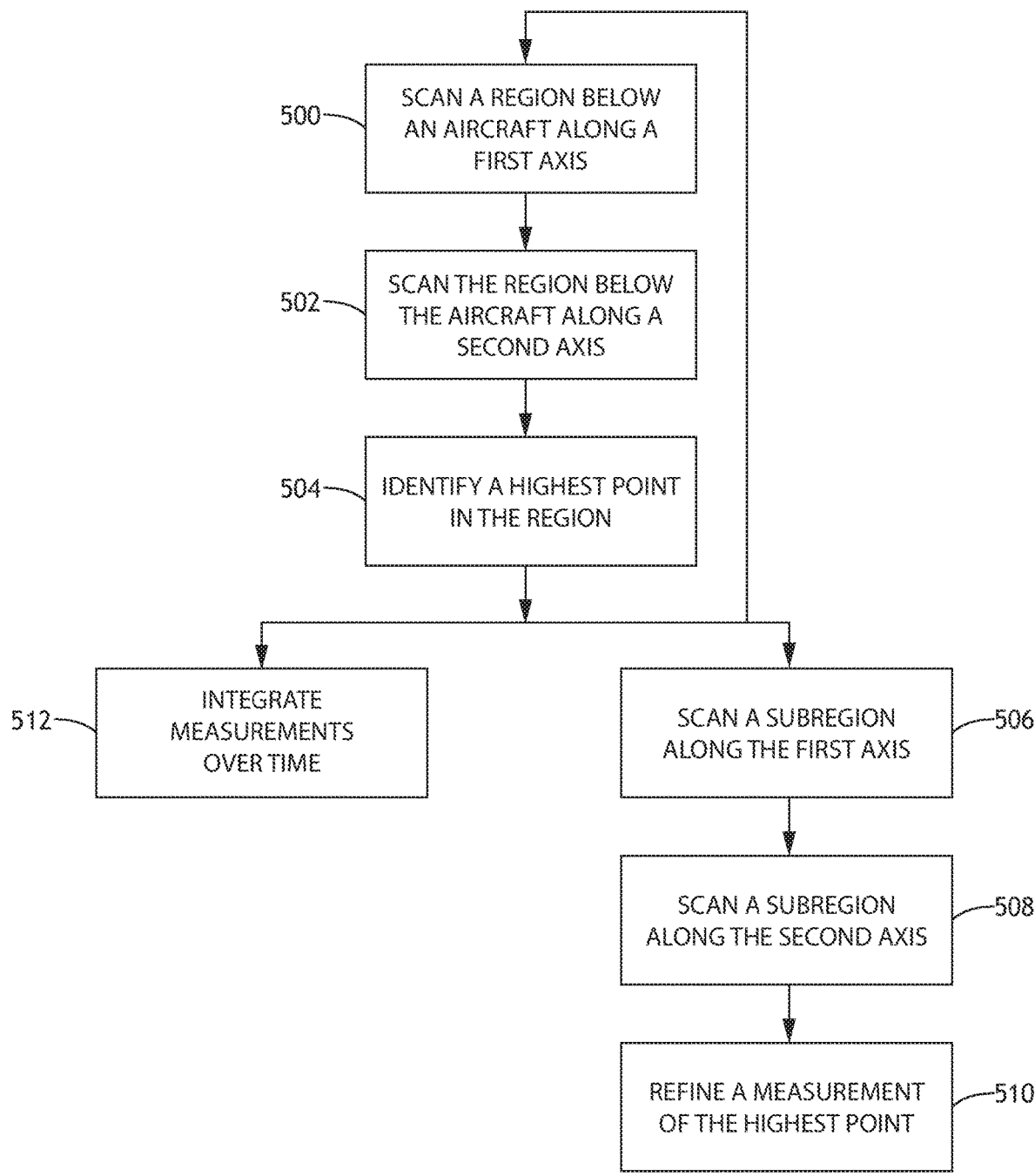
FIG. 5 shows a flowchart of a method for measuring altitude according to an exemplary embodiment.

Referring to FIG. 5, a flowchart of a method for measuring altitude according to an exemplary embodiment is shown. An electronically scanned array based radar altimeter configures an electronically scanned array antenna to scan 500 or sweep a region below the aircraft along an axis from the tail of the aircraft to the nose; the electronically scanned array antenna is then configured to receive a first return signal. Then the electronically scanned array antenna is configured to scan 502 or sweep the region below the aircraft along an axis from the one wingtip to the other; the electronically scanned array antenna is then configured to receive a second return signal. Based on the return time of the first return signal and second return signal, the highest altitude in the region is identified 504. Furthermore, the location of the highest altitude point may be identified.

In at least one embodiment, the electronically scanned array antenna may be configured to scan 506, 508 or sweep a subregion of the region below the aircraft at a higher resolution, the subregion including the highest point, along the axis from the tail-to-nose, and then along the axis from wingtip-to-wingtip. The altitude and position measurements may be refined 510 based on the return signals.

In at least one embodiment, sweep measurements may be stored over time and coherently integrated 512 to produce an accurate altitude map.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A multi-mode sensor system comprising:
   an electronically scanned array antenna; and
   at least one processor in data communication with the electronically scanned array antenna and a memory storing processor executable code for configuring the at least one processor to:
   scan a region below an aircraft along a first axis via the electronically scanned array antenna;
   receive a first return signal;
   scan the region below the aircraft along a second axis via the electronically scanned array antenna;
   receive a second return signal;
   identify an altitude of a highest point in the region with reference to the first return signal and the second return signal;
   scan a subregion of the region, the subregion including the highest point, along the first axis via the electronically scanned array antenna;
   receive a third return signal;
   scan a subregion of the region, the subregion including the highest point,
   receive a fourth return signal; and
   refine a measurement of the highest point in the region with reference to the third return signal and the fourth return signal.

2. The system of claim 1, wherein the electronically scanned array antenna is configured to operate in an X-band.

3. The system of claim 1, wherein the first axis is from a tail of the aircraft to a nose of the aircraft.

4. The system of claim 1, wherein the at least one processor is further configured to:
   continuously scan along the first axis and second axis, and continuously receive corresponding first return signals and second return signals; and
   integrate the continuously received first return signals and second return signals over time.

5. The system of claim 1, wherein the system is configured as a pulse radar by sequentially configuring the electronically scanned array antenna to transmit then receive.

6. The system of claim 1, wherein the at least one processor is further configured to identify a location of the highest point based on a scan angle when the highest point is identified in each of the first return signal and second return signal.

7. A method for determining an altitude of an aircraft comprising:
    scanning a region below the aircraft along a first axis with an electronically scanned array antenna;
    receiving a first return signal;
    scanning the region below the aircraft along a second axis with an electronically scanned array antenna;
    receiving a second return signal;
    identifying a highest point in the region with reference to the first return signal and the second return signal;
    scanning a subregion of the region, the subregion including the highest point, along the first axis with the electronically scanned array antenna;
    receiving a third return signal;
    scanning a subregion of the region, the subregion including the highest point, along the first axis with the electronically scanned array antenna;
    receiving a fourth return signal; and
    refining a measurement of the highest point in the region with reference to the third return signal and the fourth return signal.

8. The method of claim 7, wherein the electronically scanned array antenna is configured to operate in an X-band.

9. The method of claim 7, further comprising:
    continuously scanning along the first axis and second axis, and continuously receiving corresponding first return signals and second return signals; and
    integrating the continuously received first return signals and second return signals over time.

10. The method of claim 9, further comprising producing an altitude map based on the integrated first return signals and second return signals.

11. The method of claim 7, further comprising:
    sequentially configuring the electronically scanned array antenna to transmit before scanning; and
    configuring the electronically scanned array antenna to receive before receiving return signals.

12. The method of claim 7, further comprising identifying a location of the highest point based on a scan angle when the highest point is identified in each of the first return signal and second return signal.

13. A mobile platform comprising:
    an electronically scanned array antenna; and
    at least one processor in data communication with the electronically scanned array antenna and a memory storing processor executable code for configuring the at least one processor to:
        scan a region below an aircraft along a first axis via the electronically scanned array antenna;
        receive a first return signal;
        scan the region below the aircraft along a second axis via the electronically scanned array antenna;
        receive a second return signal;
        identify an altitude of a highest point in the region with reference to the first return signal and the second return signal;
        scan a subregion of the region, the subregion including the highest point, along the first axis via the electronically scanned array antenna;
        receive a third return signal;
        scan a subregion of the region, the subregion including the highest point, along the first axis via the electronically scanned array antenna;
        receive a fourth return signal; and
        refine a measurement of the highest point in the region with reference to the third return signal and the fourth return signal.

14. The mobile platform of claim 13, wherein the first axis is from a tail of the aircraft to a nose of the aircraft.

15. The mobile platform of claim 13, wherein the at least one processor is further configured to:
    continuously scan along the first axis and second axis, and continuously receive corresponding first return signals and second return signals; and
    integrate the continuously received first return signals and second return signals over time.

16. The mobile platform of claim 13, wherein the system is configured as a pulse radar by sequentially configuring the electronically scanned array antenna to transmit then receive.

17. The mobile platform of claim 13, wherein the at least one processor is further configured to identify a location of the highest point based on a scan angle when the highest point is identified in each of the first return signal and second return signal.

* * * * *